(12) United States Patent
Zhang (10) Patent No.: US 9,239,669 B2
(45) Date of Patent: Jan. 19, 2016

(54) COMMON USER INTERFACE VIEW GROUPING AND SHARING FRAMEWORK IN ONLINE APPLICATIONS

(71) Applicant: Wenli Zhang, San Jose, CA (US)

(72) Inventor: Wenli Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 14/102,712

(22) Filed: Dec. 11, 2013

(65) Prior Publication Data

US 2015/0160810 A1   Jun. 11, 2015

(51) Int. Cl.
  *G06F 3/00* (2006.01)
  *G06F 3/0484* (2013.01)

(52) U.S. Cl.
  CPC ............................. *G06F 3/0484* (2013.01)

(58) Field of Classification Search
  CPC .................................................. G06F 3/0484
  USPC .......................................................... 715/744
  See application file for complete search history.

(56) References Cited

U.S. PATENT DOCUMENTS

| | | | | |
|---|---|---|---|---|
| 6,643,652 B2* | 11/2003 | Helgeson | ............ | G06F 17/30569 |
| 7,072,934 B2* | 7/2006 | Helgeson | ................ | G06F 9/468 |
| | | | | 709/203 |
| 8,516,038 B2* | 8/2013 | Jalon | ................ | G06F 17/30126 |
| | | | | 709/200 |
| 8,677,260 B1* | 3/2014 | O'Riordan | ............ | G06F 9/4443 |
| | | | | 715/762 |
| 2002/0049749 A1* | 4/2002 | Helgeson | ................ | G06F 9/468 |
| | | | | 709/203 |
| 2002/0049788 A1* | 4/2002 | Lipkin | ............... | G06F 17/30893 |
| | | | | 715/236 |
| 2002/0073080 A1* | 6/2002 | Lipkin | ............... | G06F 17/30867 |
| 2003/0093575 A1* | 5/2003 | Upton | ..................... | G06F 9/541 |
| | | | | 719/310 |
| 2006/0047780 A1* | 3/2006 | Patnude | .................. | H04L 67/02 |
| | | | | 709/219 |
| 2008/0092116 A1* | 4/2008 | Kulkarni | ................... | G06F 8/20 |
| | | | | 717/110 |
| 2010/0241507 A1* | 9/2010 | Quinn | ..................... | G06Q 30/02 |
| | | | | 705/14.42 |
| 2011/0191303 A1* | 8/2011 | Kaufman | .......... | G06F 17/30286 |
| | | | | 707/684 |
| 2012/0054714 A1* | 3/2012 | Novak | .................. | G06F 3/0482 |
| | | | | 717/105 |
| 2012/0158757 A1* | 6/2012 | Bhattacharjee | ... | G06F 17/30607 |
| | | | | 707/756 |
| 2012/0166985 A1* | 6/2012 | Friend | ................... | G06F 9/4448 |
| | | | | 715/765 |
| 2014/0136958 A1* | 5/2014 | Scattergood | ........ | H04L 67/2823 |
| | | | | 715/236 |

\* cited by examiner

*Primary Examiner* — William Titcomb (74) *Attorney, Agent, or Firm* — Schwegman Lundberg & Woessner, P.A.

(57) ABSTRACT

A system and method for a common user interface view grouping and sharing framework is described. A user interface layer generates a custom view of a user interface of an application. The custom view comprises a plurality of common views. The custom view provides common view functions shared from the plurality of common views. Common view functions are performed using custom view information provided by the custom view to the plurality of common views in response to a call from the custom view.

20 Claims, 9 Drawing Sheets

COMMON USER INTERFACE VIEW GROUPING AND SHARING FRAMEWORK IN ONLINE APPLICATIONS

FIELD

The present disclosure relates generally to a user interface view sharing framework and, in a specific example embodiment, to the common views sharing among different user interfaces in online applications.

BACKGROUND

A graphical user interface (GUI) is a user interface that allows users to interact with a computing device by directly manipulating displayed GUI elements, such as input fields, graphical icons and visual indicators (e.g., buttons, tabs, etc.). An online application is typically composed with many GUIs to have a complete solution for complex business processes. It is common that a user interface (UI) appears in many different places in an online application. If the same UI is designed and implemented in different places in the online application, these UIs will cause duplicate implementation, out of sync code, out of sync behavior and inconsistent look and feel in different places in the online application. If common UIs are not arranged properly, the whole system may not function correctly. As such, there is a need for a framework for UI view sharing that avoids duplication of UI implementation, UI look and feel inconsistency, and programming overhead.

BRIEF DESCRIPTION OF DRAWINGS

The appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the present disclosure. In the following description, for purposes of explanation, numerous specific details are set forth in order to provide an understanding of various embodiments. However, it will be evident to those skilled in the art that embodiments of the inventive subject matter may be practiced without these specific details. In general, well-known instruction instances, protocols, structures, and techniques have not been shown in detail.

A graphical user interface (GUI) is a user interface that allows users to interact with a computing device by directly manipulating displayed GUI elements, such as input fields, graphical icons and visual indicators (e.g., buttons, tabs, etc.). An online application may be composed with a lot of GUIs in order to have a complete solution for complex business processes. Current applications do not have the framework to handle different UI views to share common views. A simplistic approach to put all the sharing views together, no matter what is needed by a subject or not, may not be efficient. Current approaches fail to provide a solution to define common view layouts, common settings, common functions and common call back function handling together. Current approaches make code line either duplicative or out of sync, not well organized, and carry a lot of redundant views in the different UIs. In particular, the same UI view may end up with a different look and feel and have different functionalities.

The present disclosure considers a layered approach of UI view sharing grouping, and layered and composite view approach for view sharing. The present disclosure also provides the solution to handle common view design, custom view usage, call back mechanisms for common views and common view settings for custom UI view in an organized way.

Examples of a system and method for a common user interface view grouping and sharing framework are described. A user interface layer generates a custom view of a user interface of an application. The custom view comprises a plurality of common views. The custom view provides common view functions shared from the plurality of common views. The controller layer performs the common view functions using custom view information provided from the custom view to the plurality of common views in response to a call from the custom view.

In one embodiment, a common view subject group is formed by categorizing common views available for sharing from the application. A common view layout, common view callback functions, common view settings, and common view functions within the common view are defined. The common view may use other common views within the common view layout and other common view functions. In other words, the common views can be nested.

In one embodiment, a new user interface is divided into a plurality of self-contained areas. The self-contained areas that are reusable within the new user interface are identified from the plurality of self-contained areas. A common area is identified from the reusable self-contained areas for a reusable view using a layered approach. Configurable components within the common area are identified. Callback functions within the common area are also identified.

In another embodiment, a custom view suffix is generated for the custom view. The custom view suffix distinguishes different common view calls and different common view layouts. The custom view suffix is provided to a corresponding common view function from the plurality of common views.

In another embodiment, custom view settings are generated for the custom view. The custom view settings are provided to the corresponding common view function from the plurality of common views.

In another embodiment, a determination is made as to whether the call from the custom view requires a callback request from the plurality of common views. Custom view object information may be provided to the corresponding common view function from the plurality of common views.

Figure 1:
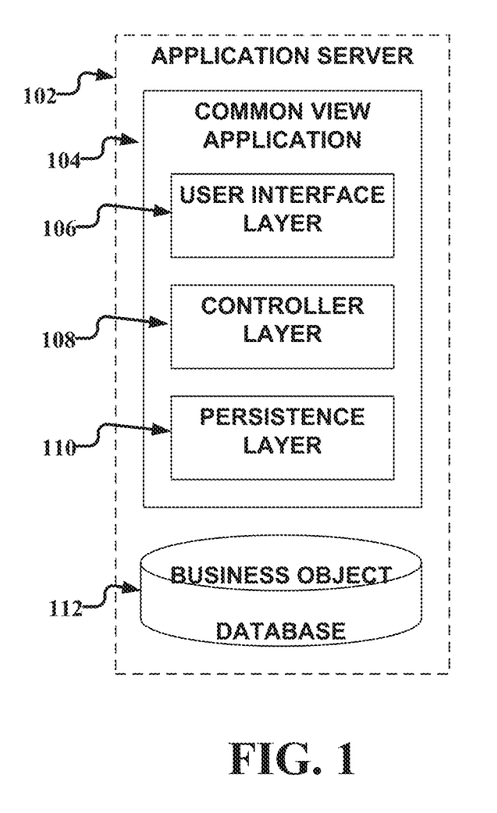
FIG. 1 is a block diagram illustrating an example of a system in which embodiments may be practiced.

With reference to FIG. 1, an application server 102, in which example embodiments may be practiced, is shown. The application server 102 may provide one or more services to one or more clients. The clients may include a device (e.g., a smart phone, desktop/laptop computer, or a tablet computer) through which a user may access and use the one or more services provided by the common view application 104 and the business object database 112.

In one embodiment, the application server 102 comprises a common view application 104 for providing the common user interface view grouping and sharing framework and a business object database 112. The business object database 112 may include, for example, an in-memory system made up of an in-memory application and an in-memory database. The in-memory database 112 may include a database management system that primarily relies on main memory for computer data storage. It is contrasted with database management systems that employ a disk storage mechanism. One example of an in-memory database is the HANA system from SAP AG of Walldorf, Germany.

The common view application 104 may provide a UI view sharing framework in which common views are shared among different UIs in online applications. For example, the present disclosure considers a layered approach of UI view sharing grouping, and a layered and composite view approach for view sharing. Furthermore, the common view application 104 also provides the solution to handle common view design, custom view usage, callback mechanisms for common views and common view settings for custom UI views in an organized manner.

The common view application 104 provides a methodology for view sharing grouping, view sharing referencing, view sharing composition and the detail design of common views and custom views. Views are the building blocks for constructing a user interface. A common view may be a UI view that can be shared among other UI views that need the content of the common views. A custom view in this context is a view of an application's UI that can meets one of the application's special requirement.

When online applications have a common view that can be used for sharing, the common view application 104 first categorizes the view into a common view subject group. The common view application 104 then defines the common view layout, the common view callback functions, the common view settings, and the common view functions in the common view. The common view can use other common views in its layout and use other common view functions. When a custom view wants to use the framework to benefit the sharing of common views, the custom view provides the custom view specific settings to the common view, and implements the common view required callback functions. Different common view calls and common view layouts can be distinguished using custom view suffixes. The custom view can then use the common view. Also, the custom view can use the common view common functions. Otherwise, the custom view uses the default settings provided by common sharing views. The common view can also pass the common view information to custom view for processing.

In one embodiment, the common view application 104 includes a user interface layer 106, a controller layer 108, and a persistence layer 110.

The user interface layer 106 provides a view layer for grouped common view layout renderings, common view settings and common view function definitions. The view layer also performs common view and custom view' view related functions. The user interface layer 106 may also be used for custom view renderings. In the user interface layer 106, generic common views and common subject views for common view sharing are defined in a managed grouping way.

The controller layer 108 supports common view and custom view rendering functions that need to communicate to business objects and a model layer that the main object and other associated business objects reside in. For example, the controller layer 108 acts as a bridge between the user interface layer 106 and the model layer. The UI layer 106 delegates required function to the controller layer 108. The controller layer 108 operates the model layer to satisfy UI required functions.

In another embodiment, the controller layer 108 may be used to handle functions of common views and custom views that need to deal with business logic and normally need to interact with model layer.

In one example implementation scenario, JavaScript, JSON, and XML may be used for the technology inside the UI layer 106. Java Servlet may be used for the server side controller as a concrete controller handling method, whereas other classes and files may use Java and XML. The model layer may use SAP Hana studio for database handling. However, the technique of the present disclosure can be implemented in any business applications.

The present disclosure can be written in Java, C/C++, or any other languages. For example, the common view application 104 may use JavaScript and HTML5 for the view implementation. The common views may be implemented in JavaScript files. The custom views may also be implemented in JavaScript files. The settings utilize parameter passing in JavaScript. The call back method may be implemented in a custom view JavaScript file. The controllers may be implemented using Java. The user interface layer 106 and the controller layer 108 may communicate using AJAX and JSON data format.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 1. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Clients may communicate with the application server 102 via any network that enables communication between or among machines, databases, and devices. Accordingly, the network may be a wired network, a wireless network (e.g., a mobile or cellular network), or any suitable combination thereof. The network may include one or more portions that constitute a private network, a public network (e.g., the Internet), or any suitable combination thereof.

Any one or more of the modules or applications described herein may be implemented using hardware (e.g., a processor of a machine) or a combination of hardware and software. For example, any module or application described herein may configure a processor to perform the operations described herein for that module. Moreover, any two or more of these modules or applications may be combined into a single module, and the functions described herein for a single module may be subdivided among multiple modules or applications. Furthermore, according to various example embodiments, modules and applications described herein as being implemented within a single machine, database, or device may be distributed across multiple machines, databases, or devices.

Figure 2:
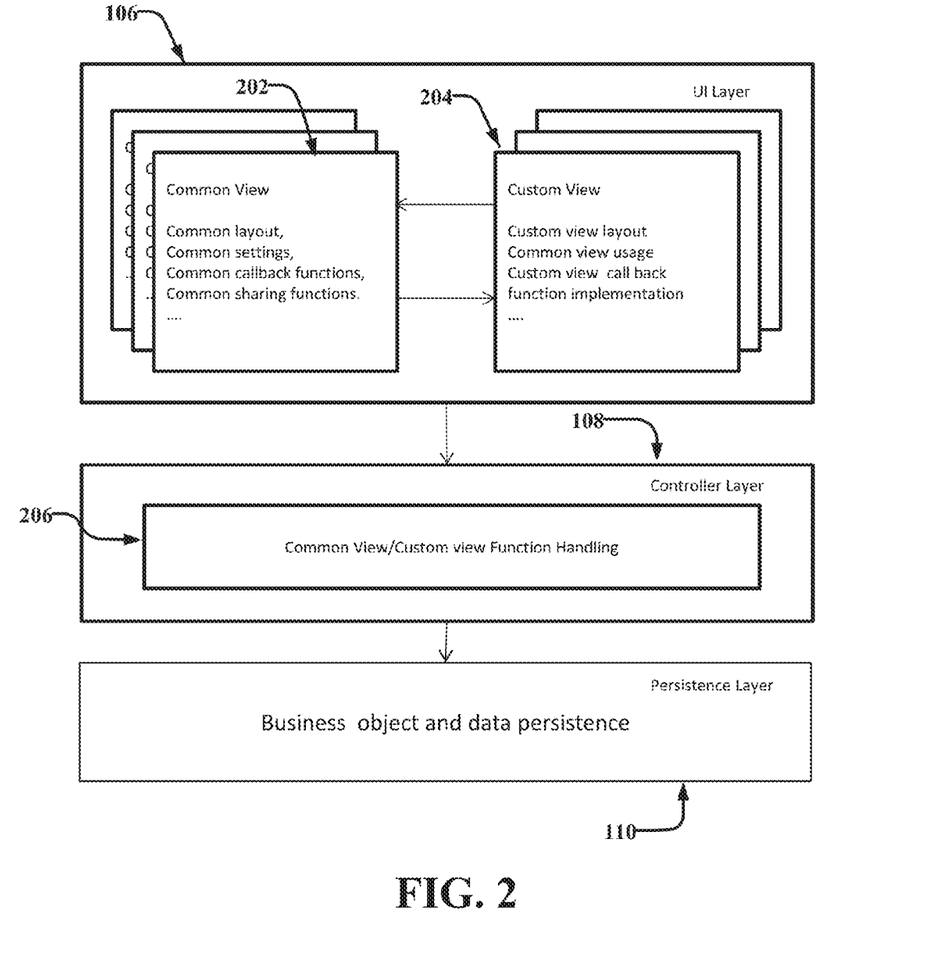
FIG. 2 is a block diagram illustrating an example embodiment of the layers in the system of FIG. 1.

FIG. 2 is a block diagram illustrating an example embodiment of the layers in the system of FIG. 1. The UI layer 106 illustrates an example of the relationship between common views and custom views. For example, the generic common views can be shared by custom views in general. The common subject views can be shared by custom views for special subjects. The common views can be composed of other common views. In other words, common views can be nested. The common views may provide the ability to take custom settings from a custom view, define call back functions for the custom view to implement and define shared function for common function sharing. The common view can also pass the common view information to the custom view for processing.

For example, a common view 202 may be defined with the following parameters: common layout, common settings, common callback functions, and common sharing functions. A custom view 204 may be defined with the following parameters: custom view layout, common view usage, custom view callback, and function implementation.

The controller layer 108 may include a common view/custom view function handling module 206.

The persistence layer 110 may comprise business object and data persistence based on the business object database 112.

Figure 3:
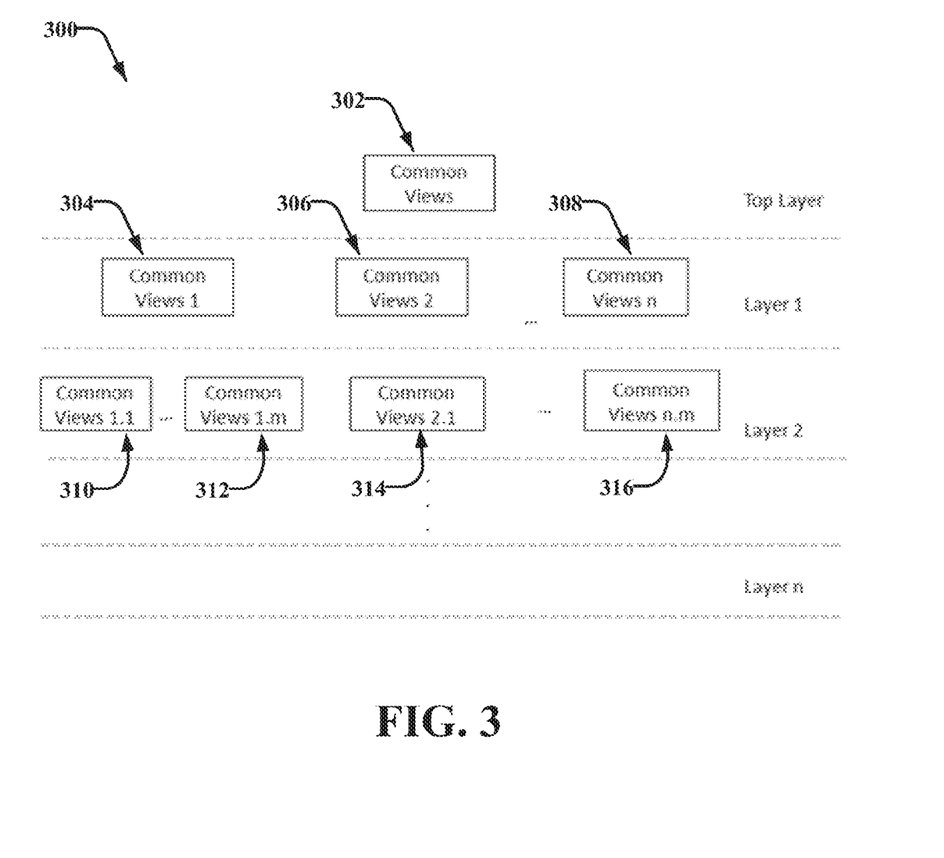
FIG. 3 is a block diagram illustrating an example embodiment of a common user interface view organization model.

FIG. 3 is a block diagram illustrating an example embodiment of a common user interface view organization model 300. The common UI views for all applications will be the top layer of the common UI views. According to the business model and functional arrangement, different layers of organization of common UI views are formed. For example, common views 302 may reside at a top layer. Common views 304, 306, 308 may reside at a layer 1 below the top layer. Common views 310, 312, 314, and 316 may reside at a layer 2 below layer 1.

Figure 4:
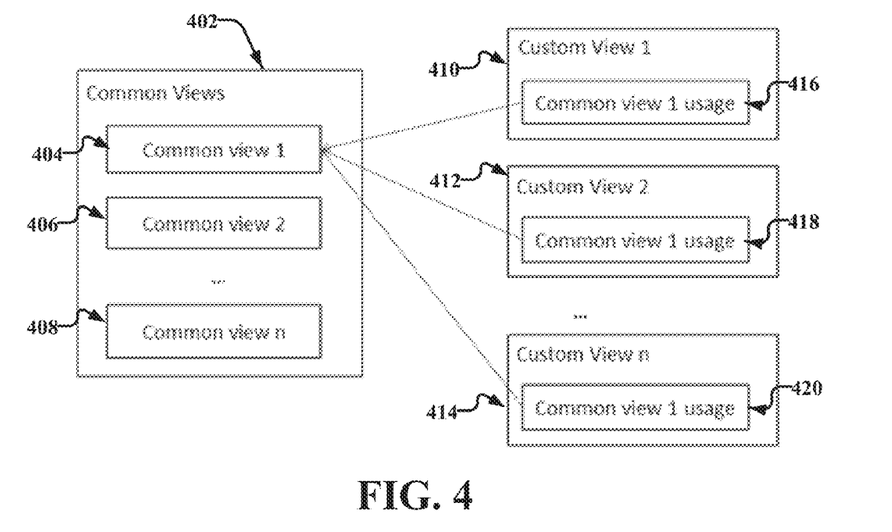
FIG. 4 is a block diagram illustrating an example embodiment of a view sharing model.

FIG. 4 is a block diagram illustrating an example embodiment of a view sharing model. The common view is sitting inside the group of common views, and the common view is referred by several custom views in the application UI. For example, common views 402 may include common views 404, 406, 408. Each common view 404, 406, 408 may further be shared in other custom views. For example, common view 404 may be shared in custom view 410, 412, and 414. Usage of the common view 404 may be defined in each custom view 410, 412, and 414 with corresponding common view usage 416, 418, 420.

Figure 5:
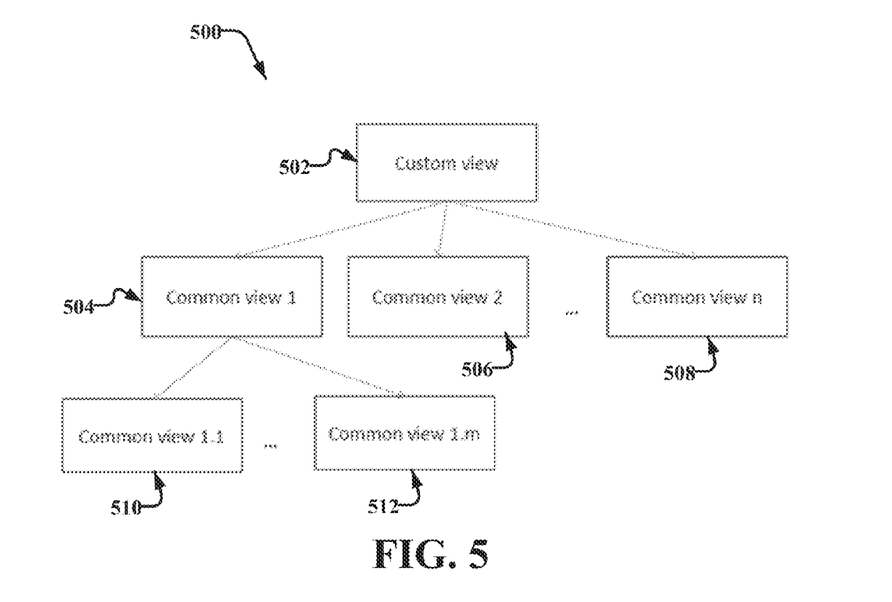
FIG. 5 is a block diagram illustrating an example embodiment of a custom view composed with common views.

FIG. 5 is a block diagram illustrating an example embodiment of a custom view composed by common views. The view sharing model 500 includes a custom view 502 that can be composed by several common views 504, 506, 508 and disposed within a same layer below the custom view 502. For example, common view 504 may be composed of common views 510 and 512 from another layer.

Figure 6:
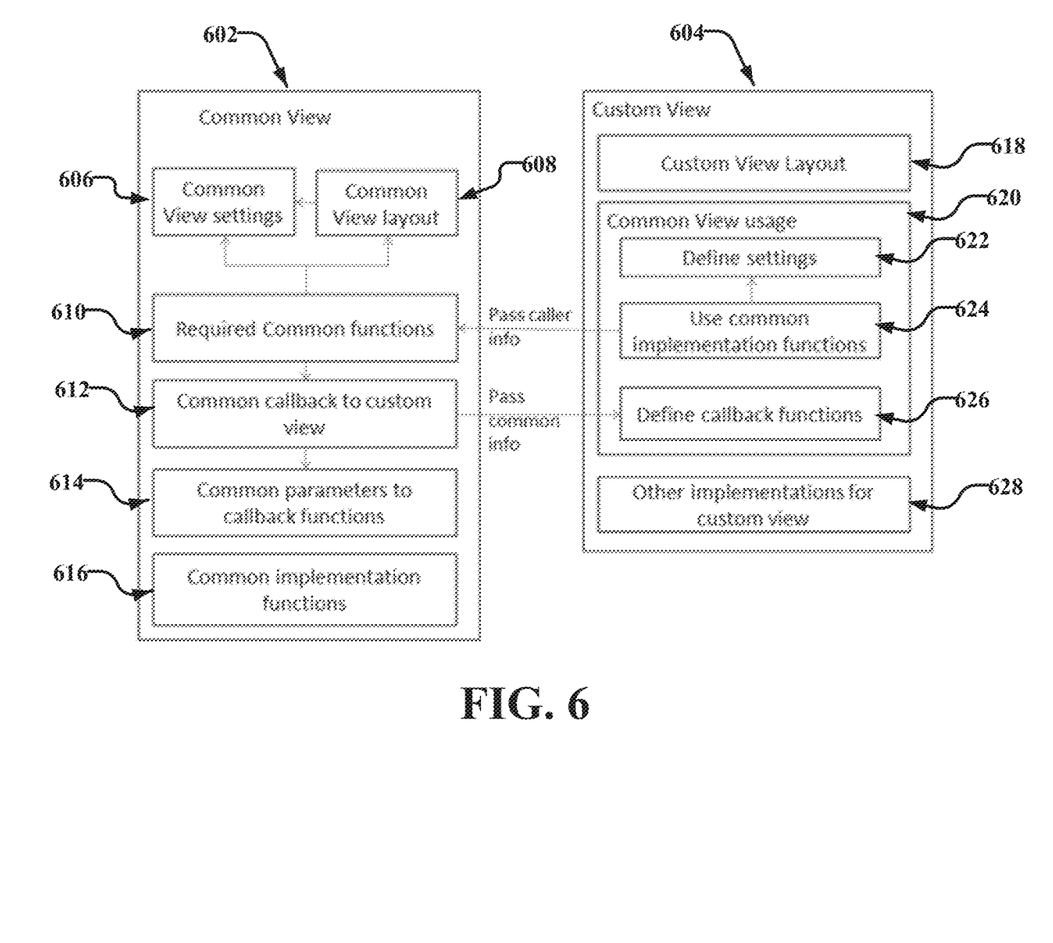
FIG. 6 is a block diagram illustrating an example embodiment of components inside the common view and custom view.

FIG. 6 illustrates a detail view sharing block diagram of the different components inside a common view 602 and a custom view 604, according to one embodiment of the present invention. For example, the common view 602 may include common view settings 606 and common view layout 608. The common view settings 606 may include, for example, the title of the common view, the visibility of certain components, features and options of components among others. The common view layout 608 may define a graphical layout of the user interface for the common view 602.

The common view 602 may also include required common functions 610, common callback to custom view 612, common parameters to callback functions 614, and common implementation functions 616. The required common functions 610 define the functionalities provided by the common view 602 and receive call information from the custom view 604. The common callback to custom view 612 enables the common view 602 to pass common information back to the custom view 604. The common parameters to callback functions 614 provide common view information that need to be used in custom call back function. The common implementation functions 616 enables the common view 602 to provide functions that are used either by common views or common used by custom views.

The custom view 604 includes a custom view layout 618, a common view usage 620, and other implementations for custom view 628. The custom view layout 618 may define a graphical layout of the user interface for the custom view 604. The common view usage 620 provides functionalities of the common view 602 for the custom view 604. In one implementation, the common view usage 620 includes settings 622, common implementation functions 624, and call back functions 626. The settings 622 are defined for the common view usage 620. The common implementation functions 624 pass the call information to the required common functions 610. The callback functions 626 are defined using the common information from the common callback to custom view 612 of the common view 602. Other implementations of the custom view 604 may be further defined in 628.

Figure 7:
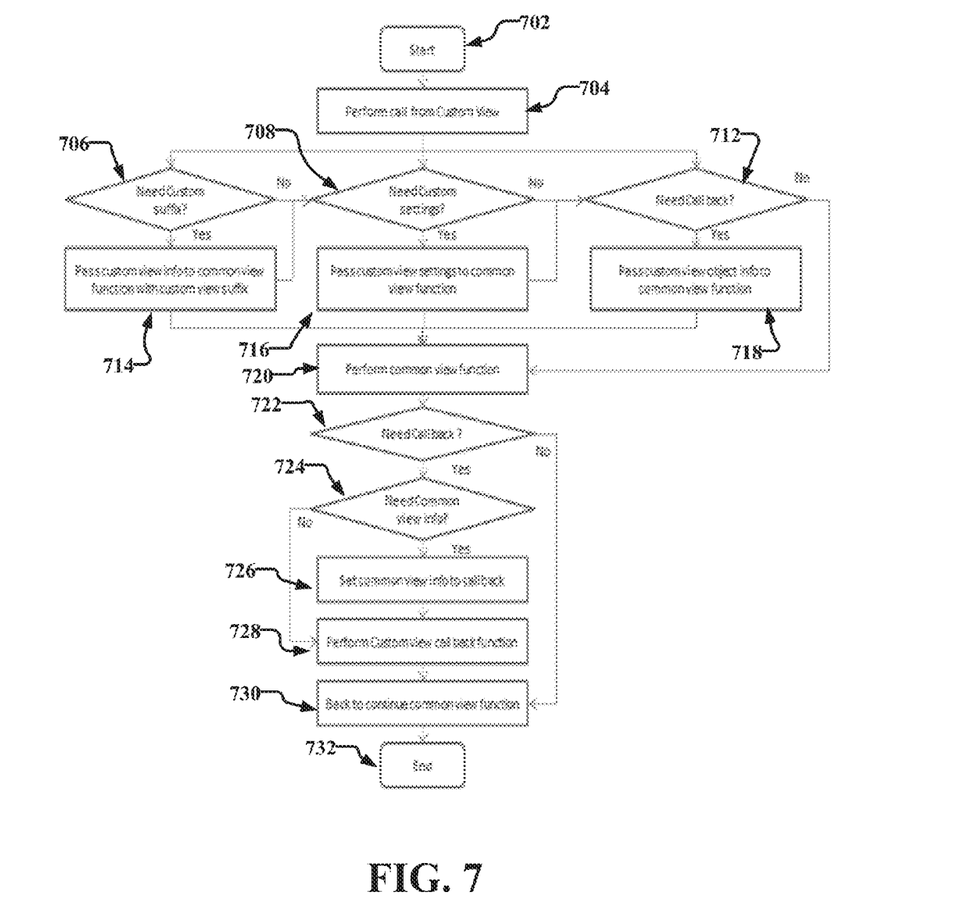
FIG. 7 is a flow diagram of an operation for operating a user interface view sharing framework, in accordance with an example embodiment.

FIG. 7 is a flow diagram of an operation for operating a user interface view sharing framework in accordance with an example embodiment. The operation of the user interface view sharing framework starts at operation 702. At operation 704, the operation starts to prepare common view call from custom view. At operation 706, the framework determines whether the call from the custom view requires a custom suffix. If the call requires a custom suffix, the custom view information is passed along with the custom view suffix to the common view function at operation 714. At operation 708, the framework determines whether the call from the custom view requires custom settings. If the call requires custom settings, customs view settings are passed to the common view function at operation 716. At operation 712, the framework determines whether the call from the custom view requires a callback to the common view. If the call requires a callback, custom view object information is passed to the common view function.

At operation 720, common view function is performed.

At operation 722, the framework determines whether a callback to the common view is required. At operation 724, if the callback is required, the framework determines whether common view information is needed. At operation 726, the framework sends common view information to callback. At operation 728, custom view callback function is performed.

At operation 730, the call proceeds to continue with a common view function. The operation ends at 732.

Figure 8:
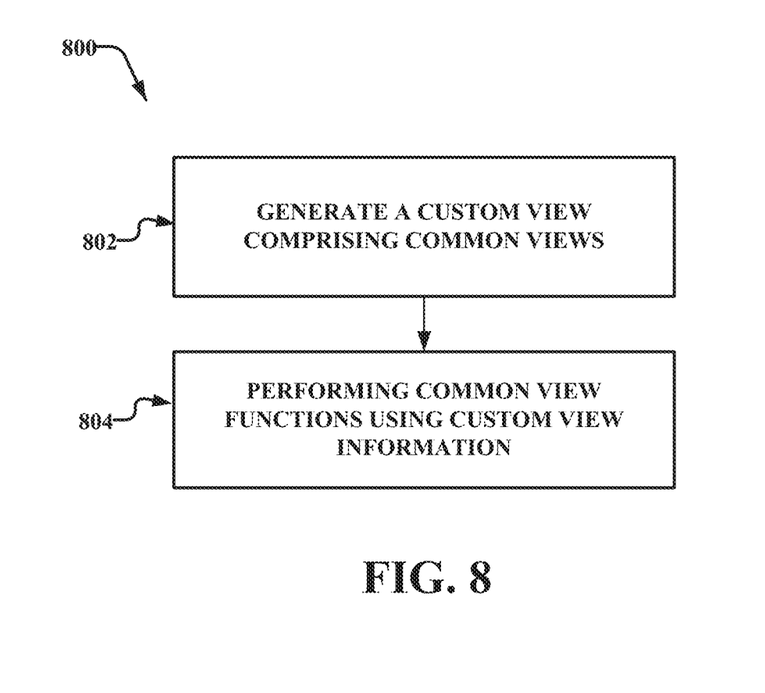
FIG. 8 is a flow diagram of an operation for operating a user interface view sharing framework, in accordance with another example embodiment.

FIG. 8 is a flow diagram of an operation 800 for operating a user interface view sharing framework in accordance with another example embodiment. At 802, a custom view of a user interface of an application is generated. The custom view may include a plurality of common views, the custom view providing common view functions shared from the plurality of common views. At operation 804, the common view functions are performed using custom view information provided by the custom view to the plurality of common views in response to a call from the custom view.

Figure 9:
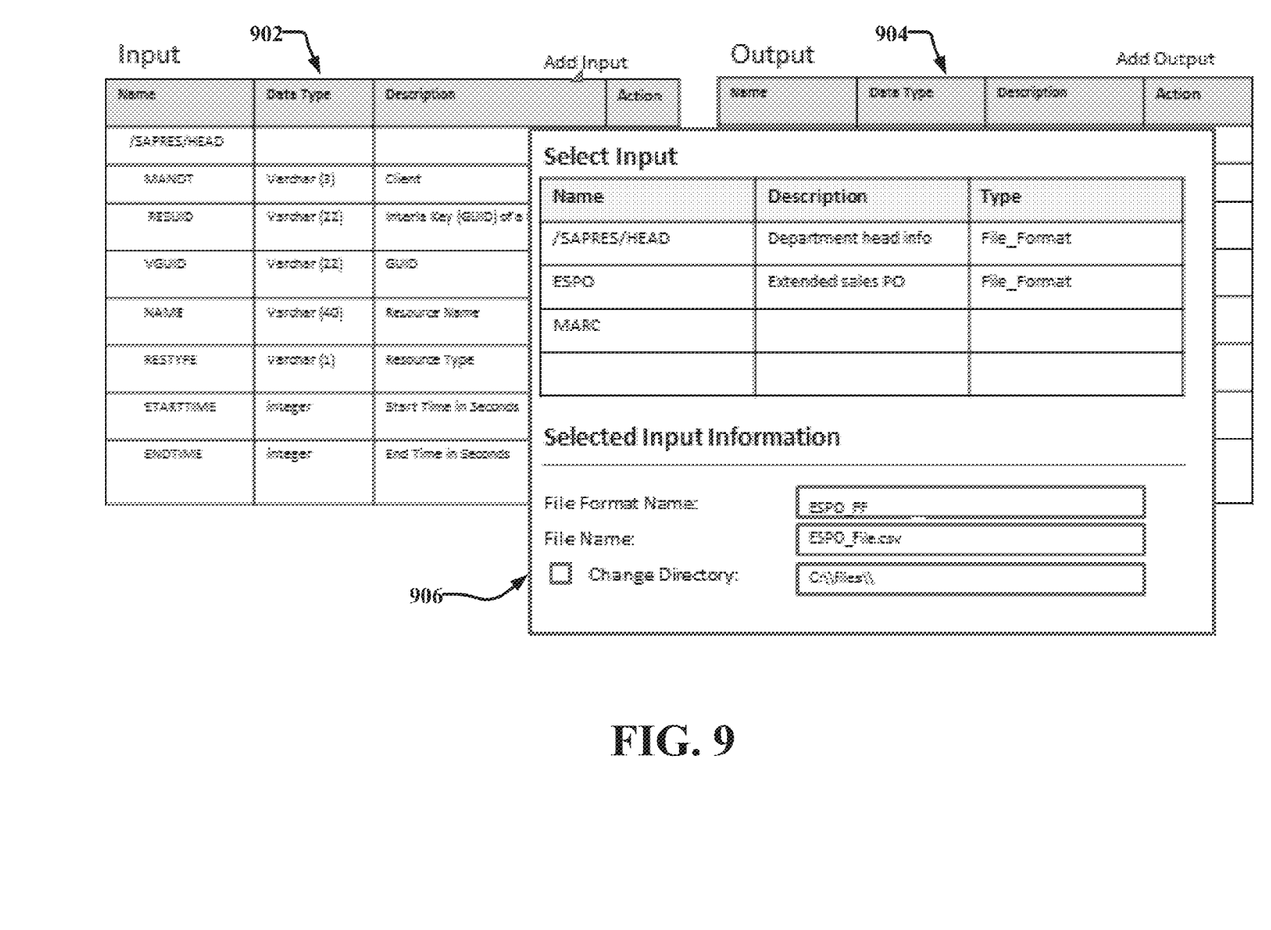
FIG. 9 is a block diagram illustrating an example of a graphical user interface (GUI) that uses reusable UI components.

FIG. 9 is a block diagram illustrating an example of a graphical user interface (GUI) that uses reusable UI components. In this figure, the "Add Input" from the input view 902 triggers the call to load a reusable UI component for file format selection in the user view 906. Another reusable UI component "File Format Details" from the input view 902 is used inside the reusable UI component. User view 904 illustrates an example of an output table.

In file format UI development, several UIs have been identified as identical or almost identical. For example, file format details have been used in:
File format as input dialog,
File format as output dialog,
File format reader options,
File format loader options.
File format options has been used in:
File format creation wizard from table,
File format creation wizard from sample file,
File format option edit,
File format creation from scratch.
File format selection dialog:
File format as Input dialog,
File format as Output dialog.

In order to share views that are used for all those UIs, the present framework provides the ability for common implementation for any common views. The framework provides common view grouping and organization by making all the file format common views in the common file format.

The framework provides common view layout handling. For example, in file format layout handling, once any view in common, the framework abstracts to the common view of file format.

The framework allows nested common views (e.g., one common view can sit inside another common view).

The framework also provides common view function handling. Common view functions can be defined for sharing. Those functions can either be shared by common views or shared by custom views.

The framework handles custom view object methods (call back). The framework allows the common view to receive the custom view as an input object and, within the common view, to call custom view defined concrete methods. One example implementation may be as follows: Custom object as an input to the common view method, in the common view method call custom view defined method with common naming call back function.

The framework handles custom view special settings. Different custom views might have different settings. The framework allows concrete custom view settings being processed inside the common view to reflect concrete custom view's flavor. Each custom view can provide different custom view suffixes to the common view to distinguish different common view calls and layouts.

The framework allows common view information to pass to custom view methods. When call custom view method in common view, under some situation there is a need to pass common view information to custom view. It is realized by passing common view information to the custom view by passing the information to the call back function.

Figure 10:
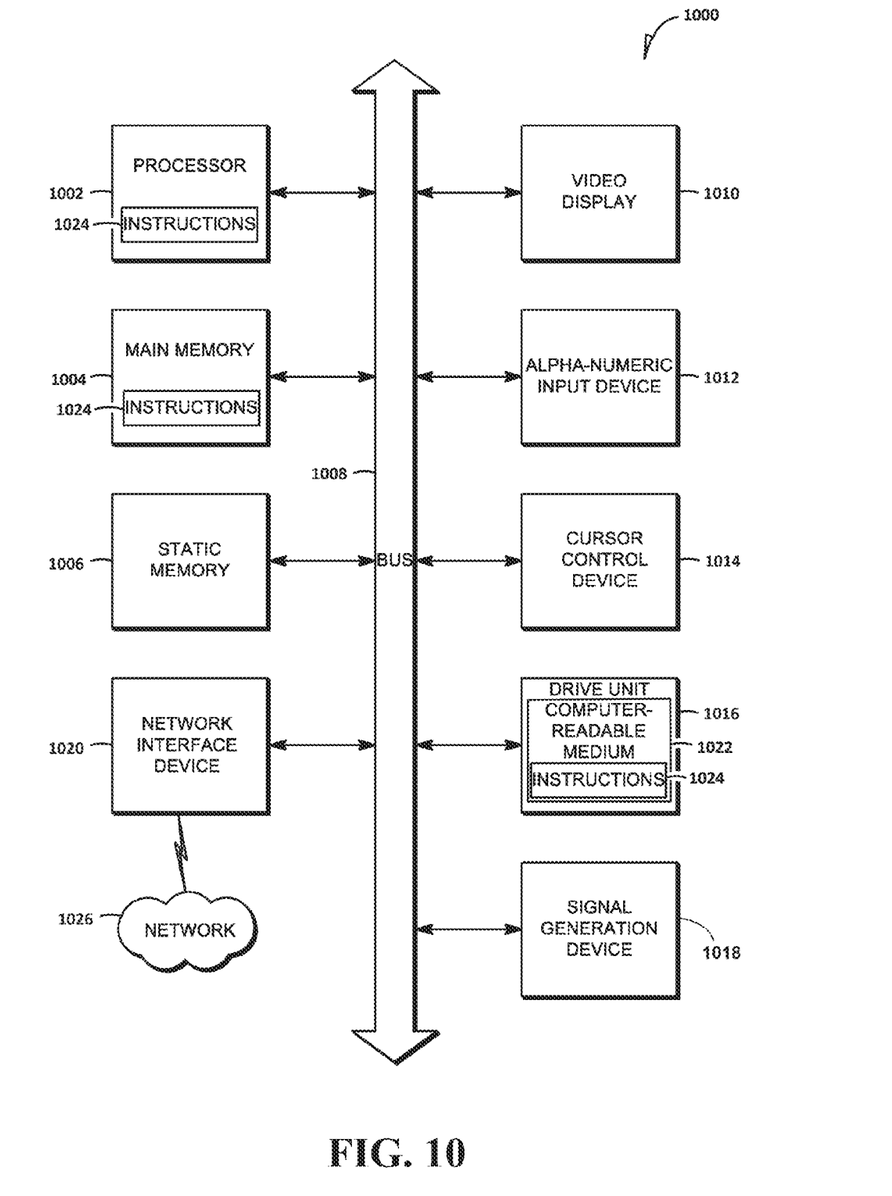
FIG. 10 is a block diagram of a machine, in an example form of a computing system, within which a set of instructions for causing the machine to perform any one or more of the methodologies discussed herein may be executed.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine 1000 capable of executing the instructions 1024, sequentially or otherwise, that specify actions to be taken by that machine 1000. Further, while only a single machine is illustrated, the term "machine" shall also be taken to include a collection of machines that, individually or jointly, execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both during execution thereof by the machine 1000. Accordingly, the main memory 1004 and the processor 1002 may be considered as machine-readable media 1022. The instructions 1024 may be transmitted or received over a network 1026) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions (e.g., 1024). The term "machine-readable medium" shall also be taken to include any medium or combination of multiple media, that is capable of storing instructions (e.g., 1024) for execution by a machine (e.g., machine 1000), such that the instructions (e.g., 1024), when executed by one or more processors of the machine (e.g., processor 1002), cause the machine (e.g., 1000) to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall, accordingly, be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations, and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or in any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may, accordingly, configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. However, these words are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   generating, using a processor of a machine, a custom view of a user interface of an application, the custom view comprising a plurality of common views, the custom view providing common view functions shared from the plurality of common views; and
   performing the common view functions using custom view information provided from the custom view to the plurality of common views in response to a call from the custom view.

2. The computer-implemented method of claim 1 further comprising:
   forming a common view subject group by categorizing common views available for sharing from the application; and
   defining a common view layout, common view callback functions, common view settings, and common view functions in the common view, the common view using other common views in the common view layout and other common view functions.

3. The computer-implemented method of claim 1 wherein generating comprises:
   dividing a new user interface into a plurality of self-contained areas;
   identifying self-contained areas that are reusable within the new user interface from the plurality of self-contained areas;
   identifying a common area from the reusable self-contained areas for a reusable view using a layered approach;
   identifying configurable components within the common area; and
   identifying callback functions within the common area.

4. The computer-implemented method of claim 1 further comprising:
   generating a custom view suffix for the custom view, the custom view suffix distinguishing different common view calls and different common view layouts; and
   providing the custom view suffix to a corresponding common view function from the plurality of common views.

5. The computer-implemented method of claim 1 further comprising:
   generating custom view settings for the custom view; and
   providing the custom view settings to a corresponding common view function from the plurality of common views.

6. The computer-implemented method of claim 1 further comprising:
   determining whether the call from the custom view requires a callback request from the plurality of common views; and
   providing custom view object information to a corresponding common view function from the plurality of common views.

7. The computer-implemented method of claim 1 wherein performing the common view functions further comprises:
   determining whether the common view functions require a callback request from the plurality of common views;
   providing common view object information to the callback request; and
   processing a custom view callback function.

8. The computer-implemented method of claim 1 further comprising:
   grouping shared views from common views;
   referencing the shared views from the custom view; and
   composing the shared views in the custom view.

9. The computer-implemented method of claim 1 further comprising:
   defining generic common views and common subject views for common view sharing, the generic common views shared by custom views by default, the common subject views shared by custom views for specific subjects.

10. The computer-implemented method of claim 1 wherein the custom view includes a layered plurality of common views.

11. A system comprising:
    a processor having a user interface layer and a controller layer, the user interface layer configured to generate a custom view of a user interface of an application, the custom view comprising a plurality of common views, the custom view providing common view functions shared from the plurality of common views, and the controller layer configured to perform the common view functions using custom view information provided from the custom view to the plurality of common views in response to a call from the custom view.

12. The system of claim 11 wherein the user interface layer is configured to form a common view subject group by categorizing common views available for sharing from the application, wherein a view layer of the processor is configured to define a common view layout, common view callback functions, common view settings, and common view functions in a common view, the common view using other common views in the common view layout and other common view functions.

13. The system of claim 11 wherein the user interface layer is configured to:
divide a new user interface into a plurality of self-contained areas;
identify self-contained areas that are reusable within the new user interface from the plurality of self-contained areas;
identify a common area from the reusable self-contained areas for a reusable view using a layered approach;
identify configurable components within the common area; and
identify callback functions within the common area.

14. The system of claim 11 wherein the user interface layer is configured to:
generate a custom view suffix for the custom view, the custom view suffix distinguishing different common view calls and different common view layouts; and
provide the custom view suffix to a corresponding common view function from the plurality of common views.

15. The system of claim 11 wherein the user interface layer is configured to:
generate custom view settings for the custom view; and
provide the custom view settings to a corresponding common view function from the plurality of common views.

16. The system of claim 11 wherein the user interface layer is configured to:
determine whether the call from the custom view requires a callback request from the plurality of common views; and
provide custom view object information to a corresponding common view function from the plurality of common views.

17. The system of claim 11 wherein the user interface layer is configured to:
determine whether the common view functions require a callback request from the plurality of common views;
provide common view object information to the callback request; and
process a custom view callback function.

18. The system of claim 11 wherein the user interface layer is configured to:
group shared views from the plurality of common views;
reference the shared views from the custom view; and
compose the shared views in the custom view.

19. The system of claim 11 wherein the user interface layer is configured to:
define generic common views and common subject views for common view sharing, the generic common views shared by custom views by default, the common subject views shared by custom views for specific subjects.

20. A non-transitory machine-readable storage medium storing instructions which, when executed by at least one processor, performs operations comprising:
generating a custom view of a user interface of an application, the custom view comprising a plurality of common views, the custom view providing common view functions shared from the plurality of common views; and
performing the common view functions using custom view information provided from the custom view to the plurality of common views in response to a call from the custom view.

* * * * *